April 8, 1969 L. W. GATES 3,437,220
HARVESTER ADAPTABLE TO VARIOUS ROW SPACINGS
Filed May 29, 1967 Sheet 1 of 3
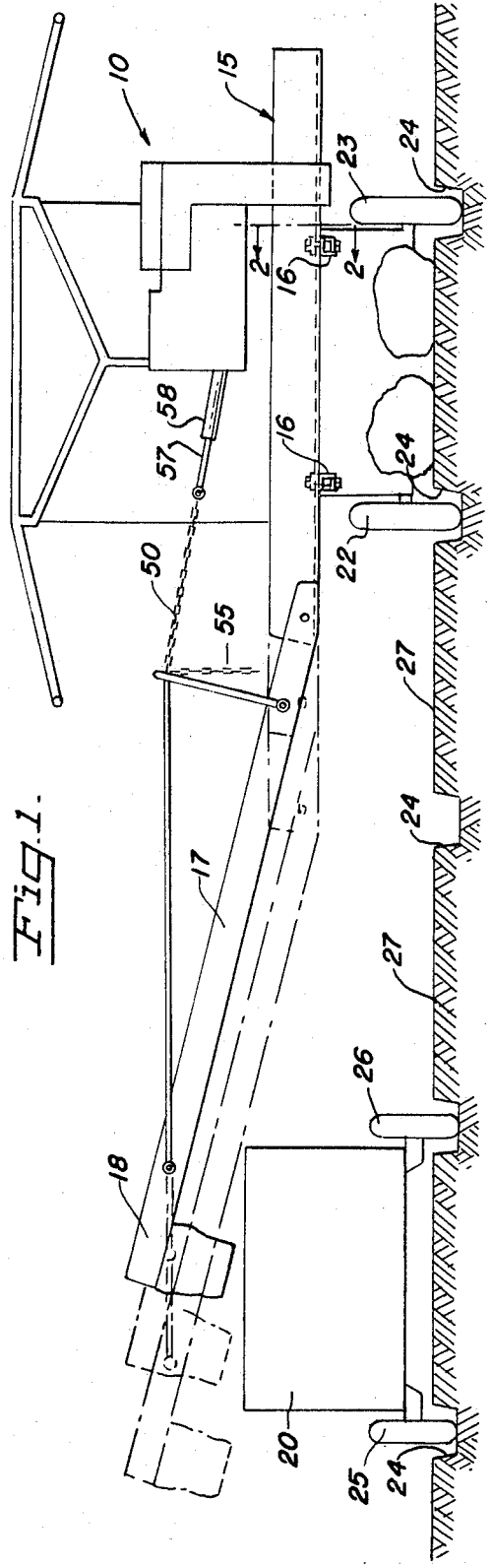
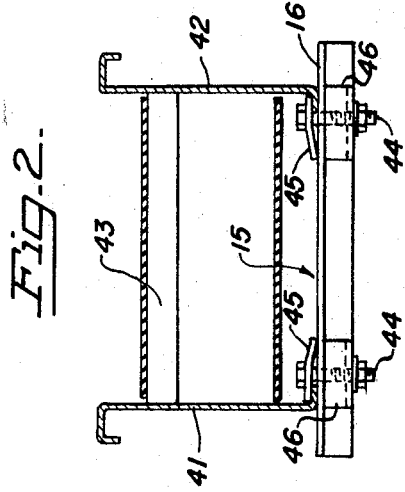
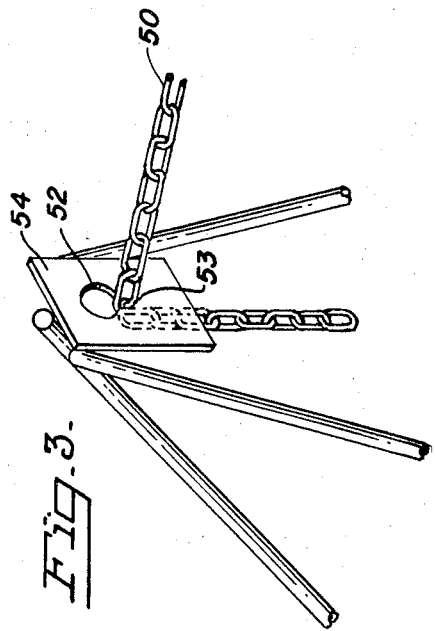
INVENTOR
LAUREN W. GATES
BY
Owen, Wickersham & Erickson
ATTORNEYS INVENTOR
LAUREN W. GATES
BY
Owen, Wickersham & Erickson
ATTORNEYS

54" ROW SPACING

60" ROW SPACING

66" ROW SPACING

INVENTOR
LAUREN W. GATES
BY

Owen, Wickersham & Erickson
ATTORNEYS

United States Patent Office 3,437,220
Patented Apr. 8, 1969

3,437,220
HARVESTER ADAPTABLE TO VARIOUS ROW SPACINGS
Lauren W. Gates, Rio Vista, Calif., assignor to The Regents of the University of California, Berkeley, Calif.
Filed May 29, 1967, Ser. No. 641,960
Int. Cl. B65g 67/08; B60b 19/00
U.S. Cl. 214—42                                   10 Claims

ABSTRACT OF THE DISCLOSURE

To accommodate differences in row spacings of crops, the harvester is provided with (1) means for adjusting the wheel spacing, (2) means for adjusting the position of an overlength cross-conveyor, and (3) means for adjusting the connection between a pivoted boom conveyor and its lifting apparatus. This enables delivery of the harvested crop to a conveyance moving beside the harvester a few rows away.

---

This invention relates to an improved harvesting machine, particularly applicable for harvesting row crops such as tomatoes, where the fruit is delivered during harvesting to an accompanying vehicle moving beside the harvester.

In row-crop harvesting it is important to be able to adjust the harvester to differences in row and furrow spacing. For example, in tomato growing, there are three standard spacings in wide use, namely, fifty-four inches, sixty inches, and sixty-six inches. How to take care of the wheel and tread spacing for these two six-inch differences is known in agricultural machines and is not a substantial problem. However, with tomato harvesters and some other crop harvesters, the crop is delivered from the harvester into bins that are pulled along by tractors beside the harvester in adjacent rows. Simply to increase the tread spacing does not, therefore, solve the problem, for the harvester's output conveyor must have means for taking care of the differences which different row spacings make in the delivery distances.

For example, although the difference between fifty-four inches and sixty inches is only six inches, when the conveyor and bin truck are moving three rows apart, the output conveyor has to carry the fruit eighteen inches further, or three times as much as the difference in row spacing.

The present invention is directed to this problem of enabling easy and adequate adjustment to various row spacings, so that the harvester becomes completely adaptable to the different row spacings. In fact, although the wheel treads are usually made for six-inch differences in spacing, the present invention makes it possible to adjust the output conveyor system to accommodate any distance within selected outer limits. The invention thus enables a grower to use the same harvester in fields having different row spacings, and it enables a harvester owner to harvest in fields of different growers who use different row spacings. Thereby, it imparts great adaptability to harvesters and eliminates the need of having different machines constructed for each row spacing or having major or difficult changes when adapting. As will be seen, adjustment of the present machine is made in a very simple manner.

Other objects and advantages of the invention will appear from the following description of a preferred form thereof.

In the drawings:

FIG. 1 is a view, somewhat schematic in character, of a harvester for tomatoes and the like embodying the principles of the invention and showing in broken lines the results of moving the conveyor over by different distances.

FIG. 2 is a view in section taken along the line 2—2 in FIG. 1.

FIG. 3 is a fragmentary view in perspective of the chain anchoring device for the boom.

Figure 7:
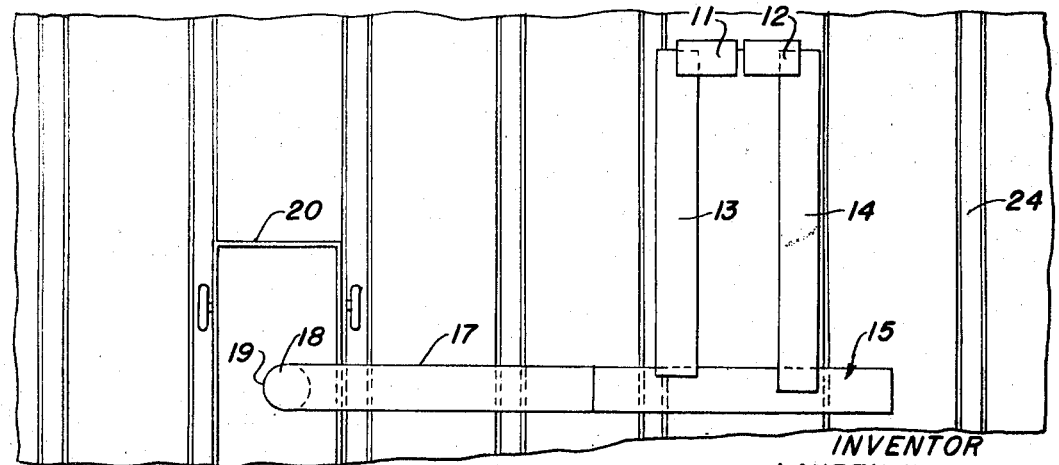
FIG. 7 is a somewhat diagrammatic top plan view showing the adjustments to the conveyor system.

The harvester 10 may be any of several on the market, of which the tomato harvesters shown in U.S. Patents 3,199,604 and 3,252,520 are good examples. Such harvesters have a cutting device followed by a pickup device, the plants being severed and then picked up and carried rearwardly and upwardly of the machine to a separating station where the tomatoes are separated from the severed plant. The plant is then discarded, and the tomatoes are placed upon a conveyor system, such as is shown diagrammatically in FIG. 7, where two rear cross-conveyors 11 and 12 receive the collected fruit and move it out to each side. At the side are sorting conveyors 13 and 14 upon which workmen sort and cull the tomatoes while the tomatoes move on to the front. There they are deposited upon a front cross-conveyor 15, which is an important feature of the present invention.

The front cross-conveyor 15, like the other conveyors, is supporetd by a main frame 16 of the harvester. From the front cross-conveyor 15 the tomatoes go to the boom conveyor 17, the outer end 18 of which can be raised and lowered and upon which the tomatoes are carried somewhat upwardly as well as outwardly. At the end 18 of the boom device is a tomato depositing device 19 such as that shown in U.S. Patent 3,187,872, from which the tomatoes fall into a bin 20 which is moved by a separate tractor or truck (not shown) a few rows apart from the harvester 10.

Figure 4:
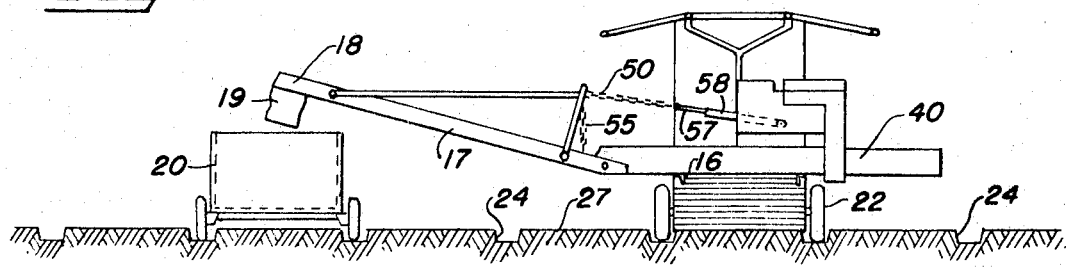
FIG. 4 is a somewhat diagrammatic view of the harvester of FIG. 1 in use with the accompanying bin, on a field with fifty-four inch spacing between rows.
Figure 5:
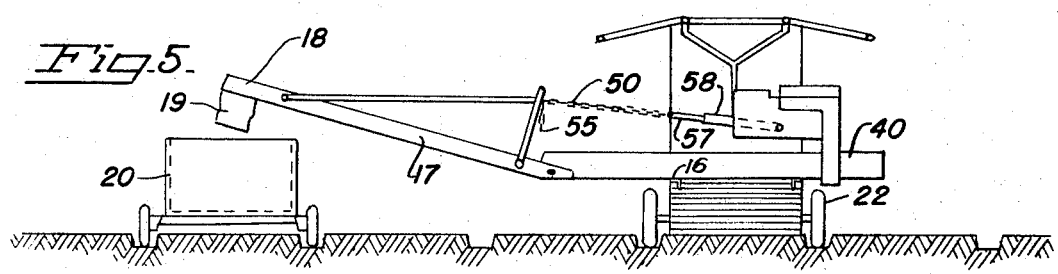
FIG. 5 is a similar view showing sixty-inch row spacing.
Figure 6:
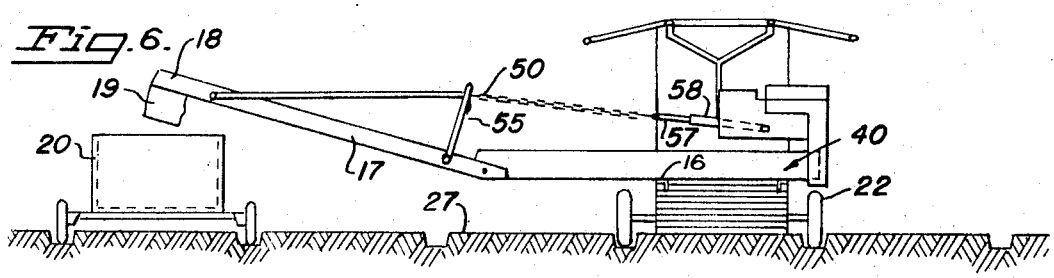
FIG. 6 is a similar view showing sixty-six inch row spacing.
Figure 8:
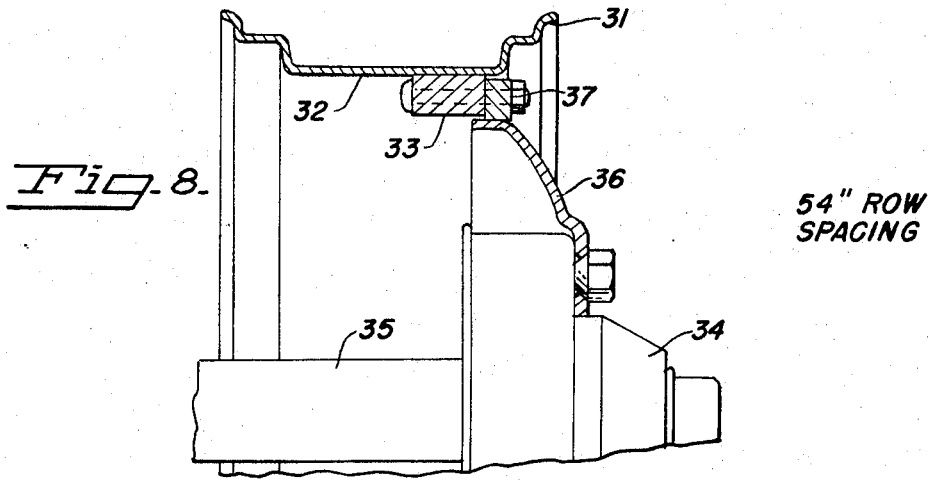
FIG. 8 is a fragmentary view in elevation and in section of one of the wheels of the harvester showing the wheel set for a fifty-four inch row spacing.
Figure 9:
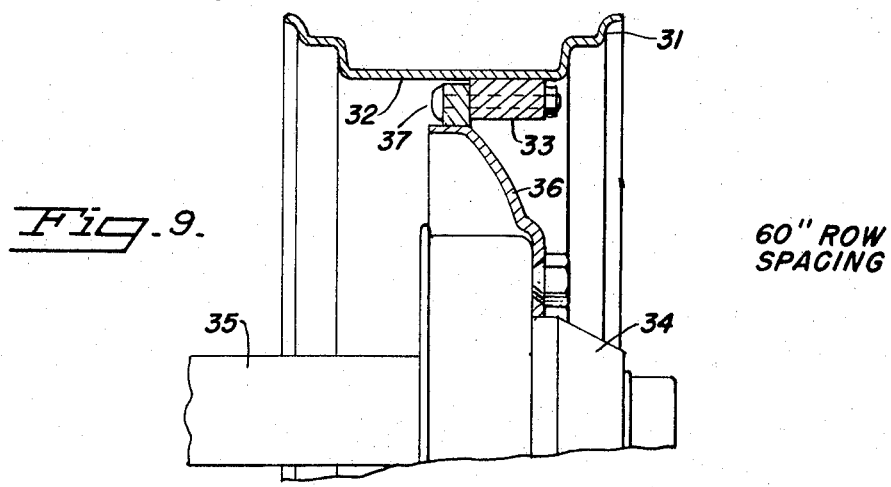
FIG. 9 is a view similar to FIG. 8 showing the wheel set for a sixty-inch spacing.
Figure 10:
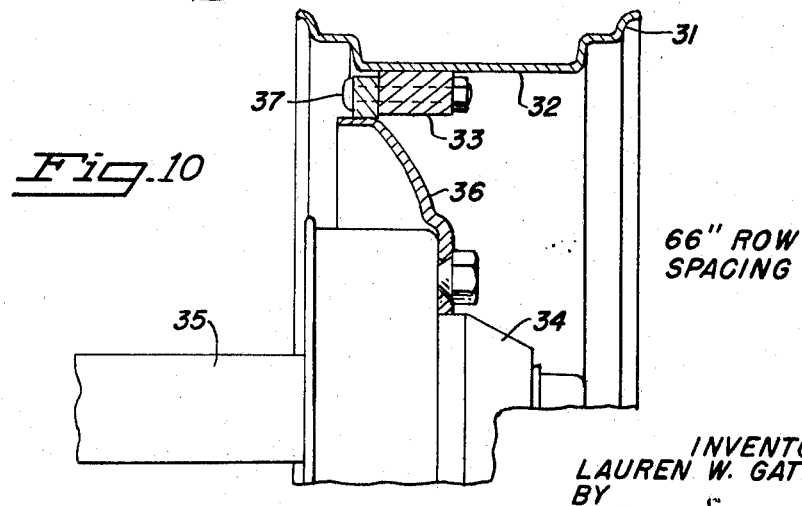
FIG. 10 is a view similar to FIGS. 8 and 9 showing a wheel set for a sixty-six inch spacing.

The harvester's wheels 22 and 23 are driven in furrows 24, as are the wheels 25 and 26 of the tractor and the bin 20, bridging rows 27. As the rows 27 are made wider, the wheels 22 and 23 and the wheels 25 and 26 have to be spaced further apart, and this is accomplished by the structure shown in FIGS. 8, 9, and 10. Each wheel comprises a rim 31 having an inner circumferential portion 32 to which is attached a spaced series of blocks 33, the circumferential spaces between the blocks 33 being wider than the blocks 33. The hub 34 is permanently attached to an axle 35 and is provided with an outwardly extending ring 36 treminating in a spaced series of blocks 37, spaced apart circumferentially in the same spacing as the blocks 33. For the narrowest spacing (the axle 35 extends to the left in FIGS. 8, 9, and 10), the rim 31 is placed as shown in FIG. 8. The blocks 33 are not centered relative to the rim portion 32 but are set to one side thereof, so that when the rim 31 is turned around (i.e., from the position shown in FIG. 8 to the position shown in FIG. 10), the blocks 33 are then on the other side of the center plane of the rim 31. Three positions are shown: first, with the rim blocks 33 inside the hub blocks 37, as shown in FIG. 8; second, with the blocks 33 outside of the blocks 37, as shown in FIG. 9, there is a three-inch difference at each wheel—a six-inch difference in tread and, finally, as shown in FIG. 10, with the wheel rim 31 turned around and the offset blocks 33 again on the outside of the blocks 37, there is another three inches difference at each wheel—another six-inch difference in tread. This enables one to make the adjustments to the wheels 22, 23 and 25, 26 to the row spacing as shown in FIGS. 4, 5 and 6.

The front conveyor 15 is, in this invention, made considerably overlength, a considerable amount longer than what is needed to span between the outer ends of the sorting conveyors 13 and 14; the conveyor's length is made to be as long as is required for the widest row spacing, typically about thirty-six inches longer than the span between the outer ends of the sorting conveyors 13 and 14. Thus, when the harvester is adjusted to a fifty-four inch row spacing, the front conveyor 15 has a portion 40 extending to the right by thirty-six inches, and the portion 40 is not then in use. The conveyor 15, instead of being welded to the frame 16, is supported thereon as shown in FIG. 2. The conveyor 15 has a pair of frame members 41, 42 welded together by cross members 43 and secured to the frame 16 by bolts 44 and large square washers or clips 45, which engage a flange 46 on each of the conveyor frame members 41, 42 and clamp it to the frame 16. When the bolts 44 are loosened, the conveyor frames 41, 42 can be slid along, and then the bolt 44 can be tightened down to hold it in any position desired, the clip 45 again engaging the flange 46. This enables the front conveyor 15 to be placed in any position relative to the conveyors 13 and 14. Thus, in the position shown in FIG. 4, the conveyor 15 is in an extreme right position; in FIG. 6 the conveyor 15 is in an extreme left position; and in FIG. 5 the conveyor 15 is in a center position.

Pivotally attached to the conveyor frame 15 is the boom 17, which must from time to time be raised and lowered. In each case it is anchored by a chain member 50 in the lowest position which it is to assume. Since the conveyor 15 is to be shifted, a rigid anchorage to the boom 17 is not practical. The chain 50, however, is provided with a chain-link arrangement, such as shown in FIG. 3, in which a link 51 of the chain 50 is put through an opening 52 and locked into a slot 53 in a plate 54. When the front cross-conveyor 15 is shifted from the FIG. 4 position to the FIG. 6 position, the chain 50 goes from a place where a free length 55 hangs down a substantial distance to a place where the free length 56 is short, as shown in the drawings. Attached to the chain 50 is a piston rod 57 of a hydraulic cylinder 58 which would otherwise be attached directly to the junction member 54 of the boom 17. Thus, when making the shift, the chain 50 is adjusted, as well as the position of the front conveyor.

Thus, to adjust the machine from one row-spacing to another involves simply (1) adjusting the wheels by the relatively simple operation shown in FIGS. 8–10, (2) shifting the conveyor frame 15, and (3) adjusting the chain 50 in the slot 53.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A harvester for row crops, wherein a harvested crop is collected on a cross-conveyor and moved transverse to the direction of movement of the harvester and is carried to one side of the harvester and, by a boom conveyor, deposited in a truck or bin moving beside the harvester, including in combination:
   a harvester main frame,
   wheels supporting said main frame, said wheels having means for readily adjusting the tread width between them,
   means for sliding said cross-conveyor transversely of said frame and for securing said cross-conveyor at any position therealong, said cross-conveyor being long enough to function properly in the widest position desired, said boom conveyor being pivotally supported by said cross-conveyor at the inboard end of said boom conveyor,
   rigid frame means rigidly secured to said boom conveyor above said boom conveyor and adjacent its inboard end, and
   power means associated with said cross-conveyor and connected to said rigid frame means for lifting the outboard end of said boom conveyor.

2. The harvester of claim 1 having connecting means connecting said power means to said rigid frame means and means for adjusting the length of said connection means between said power means and said rigid frame means.

3. The harvester of claim 2 wherein said connection means comprises a link-type chain and said rigid frame means includes a plate with an opening through which said chain passes, said opening joining a slot for anchoring any link of said chain.

4. The harvester of claim 1 wherein said cross-conveyor comprises a frame structure having a pair of horizontal flanges, bolt means on said main frame, and washers on said bolt means for clamping said flanges to said main frame.

5. A harvester for row crops, including in combination:
   a harvester main frame,
   a cross-conveyor supported on said main frame for moving a harvested crop transverse to the direction of movement of the harvester and carrying it to one side of the harvester,
   a boom conveyor, pivotally supported by said cross-conveyor at said one side, for depositing said crop in a truck or bin moving beside the harvester,
   wheels supporting said main frame, said wheels having means for readily adjusting the tread width between them, and
   means for sliding said cross-conveyor transversely of said frame and for securing said cross-conveyor at any position therealong, said cross-conveyor being long enough to properly accommodate proper funtioning when the tread width is greatest.

6. The harvester of claim 5 having power means for lifting the outboard end of said boom conveyor and means for adjusting the connection between said boom conveyor and said power means upon adjustment of said wheels and said cross-conveyor.

7. The harvester of claim 6 wherein said means for adjusting comprises rigid frame means secured to said boom conveyor having a plate with an opening having an anchoring slot and a link-type chain joining said power means to said rigid frame means, said chain passing through said opening and being anchored at any link in said slot.

8. The harvester of claim 5 wherein said cross-conveyor comprises a frame structure having a pair of horizontal flanges, bolt means on said main frame, and washers on said bolt means for clamping said flanges to said main frame.

9. A harvester for row crops, wherein a harvested crop is collected and moved on a pair of side conveyors, one on each side of the harvester and at the ends thereof the crop is transferred to a cross-conveyor bridging between the side conveyors and moved transverse to the direction of movement of the harvester and is carried to one side of the harvester and, by a boom conveyor, deposited in a truck or bin moving beside the harvester, including in combination:
   a harvester main frame, wheels supporting said main frame, said wheels having means for readily adjusting the tread width between them, means for sliding said cross-conveyor transversely of said frame and for securing said cross-conveyor at any position therealong, said cross-conveyor being enough longer than the space between the side conveyors to function properly in the widest position desired, said boom conveyor being pivotally supported by said cross-conveyor at the inboard end of said boom conveyor, rigid frame means rigidly secured to said boom conveyor above said boom conveyor and adjacent its inboard end, and power means associated with said cross-conveyor and connected to said rigid frame means for lifting the outboard end of said boom conveyor.

10. The harvester of claim 9 having connecting means connecting said power means to said rigid frame means and means for adjusting the length of said connection means between said power means and said rigid frame means.

References Cited

UNITED STATES PATENTS 2,294,256  8/1942  Uber _____ 301—9 XR
2,584,361  2/1952  Morine _____ 214—521

ROBERT G. SHERIDAN, *Primary Examiner.*

U.S. Cl. X.R.

214—522; 301—9